United States Patent [19]

Capelle

[11] Patent Number: 4,653,994
[45] Date of Patent: Mar. 31, 1987

[54] EXTRUSION HEAD FOR PRODUCING FLAT PROFILES FROM RUBBER OR PLASTICS MATERIAL

[75] Inventor: Gerd Capelle, Langenhagen, Fed. Rep. of Germany

[73] Assignee: Hermann Berstorff Maschinenbau GmbH, Hanover, Fed. Rep. of Germany

[21] Appl. No.: 867,547

[22] Filed: May 28, 1986

[30] Foreign Application Priority Data

Jun. 15, 1985 [DE] Fed. Rep. of Germany ....... 3521643

[51] Int. Cl.$^4$ ............................................. B29C 47/30
[52] U.S. Cl. .................. 425/131.1; 425/185; 425/188; 425/190; 425/462; 425/466
[58] Field of Search ............... 425/131.1, 133.1, 133.5, 425/185, 188, 190, 192 R, 462, 463, 466, 467, 465, DIG. 243; 264/171, 176 R, 177 R

[56] References Cited

U.S. PATENT DOCUMENTS

| | | | |
|---|---|---|---|
| 3,099,859 | 8/1963 | Eilersen | 425/131.1 |
| 3,486,195 | 12/1969 | Greenwood et al. | 425/131.1 |
| 3,902,835 | 9/1975 | Theysohn | 425/467 X |
| 4,137,027 | 1/1979 | Ruger | 425/188 X |
| 4,358,261 | 11/1982 | Ohki | 264/171 X |
| 4,526,528 | 7/1985 | Kline et al. | 425/190 X |
| 4,548,568 | 10/1985 | Herbert et al. | 425/462 X |
| 4,556,376 | 12/1985 | Sievers et al. | 425/133.5 |

FOREIGN PATENT DOCUMENTS 2131734 6/1984 United Kingdom ............. 425/131.1

Primary Examiner—Richard L. Chiesa
Attorney, Agent, or Firm—Schwartz, Jeffery, Schwaab, Mack, Blumenthal & Evans

[57] ABSTRACT

An extrusion head is provided for extruding flat profiles for producing tread strip portions of vehicle tires from mixtures of rubber or plastics materials, which permits one of the constituents such as the tread strip mixture to be changed without adversely affecting the other constituent parts of the mixture, such as the lateral rubber strip mixtures and the base rubber layer. This is achieved by suitably deflecting the flow channels for the lateral rubber layers in a front template. The flow channel for the lateral strips enters the template below the flow channel for the tread strip but discharges alongside the lateral edges of the tread strip. The head comprises a fixed central portion and pivotable upper and lower portions, the flow channels for the constituents of the mixture being defined by channels formed in insert members located between the head portions. By so doing, the flow channels for the base layer and for the lateral strips can be formed in one of the insert members leaving only the flow channel for the tread strip to be formed in the other insert member. Since it is the tread strip mixture which is most frequently changed, this can now be effected without adversely affecting the other two mixtures.

1 Claim, 8 Drawing Figures

EXTRUSION HEAD FOR PRODUCING FLAT PROFILES FROM RUBBER OR PLASTICS MATERIAL

FIELD OF THE INVENTION

The present invention relates to an extrusion head. More specifically, the present invention relates to an upwardly pivotable extrusion head for producing flat profiles from rubber or plastics materials.

BACKGROUND OF THE INVENTION AND PRIOR ART DISCUSSION

An extrusion head is known, from British Patent Specification No. 2131734A, which is fed by a plurality of extrusion devices disposed one above the other. The head comprises a fixed central portion and upper and lower portions which are pivotable towards and away from the central portion. Between each of the upper and lower portions and the central portion, insert members are provided which, together with an adjacent planar surface of respective ones of the head portions, define flow channels for the materials extruded from the extrusion devices. It is also known to provide a front template in the head which has flow channel sections formed therein and an end template which determines the external configuration of the profile being extruded.

Such an arrangement can be used for producing tread strip portions for motor vehicle tyres. In such a case, the profile is made from three different types of mixture. Thus, the mixture used to produce the tread surface must be highly wear-resistant, that used to form the lateral portions must be very resilient and the lower or base portion is formed from a mixture which is softer than the tread surface mixture.

These three mixtures, the viscosities of which differ considerably from one another must be brought together in the extrusion head and combined to form a single tread strip profile. However, the mixtures must have approximately the same flow rates in the flow channels.

In the arrangement disclosed in British Patent Specification No. 2131734A, it is necessary that the upper and lower portions are pivotable so that the flow channels can be cleaned when the mixture flowing therethrough is to be changed or if different flow channel insert members are to be inserted because the dimensions of the profile being produced are to be changed. The insert members disposed in the head are each formed in one piece with the flow channels being formed in their upper and/or lower surfaces. If it is desired to extrude a different size of tread strip portion, the end and, if necessary, the front template are changed. If the tread strip sizes differ significantly from one another, the insert members are also changed.

In practice, there may be eight to ten changes of the tread strip mixture in each working shift so as to permit, for example, both summer and winter tyres of different sizes to be produced during the shift. When a new profile is to be produced, it is usually the rubber mixture for the tread strip portion which is changed, whereas the rubber mixtures for the lateral strips and lower or base layer are only changed infrequently. To permit the mixture for the tread strip to be changed, the extrusion head must be upwardly pivoted.

As a result of such upward pivotal movement, the material in the flow channels becomes deformed and, in consequence, has to be removed. In addition, air enters the flow channels through which rubber mixtures which are not to be changed are flowing. This causes the formation of air bubbles therein and deviations in the dimensions of the profile when the apparatus is restarted. Accordingly, unusable waste material is produced until the air has been expressed from the inserts, the front template and the end template.

Accordingly, all of the extrusion devices have to be emtied and refilled, even though only one of the mixtures has been changed. This means that a considerable amount of time and material is wasted.

OBJECTS OF THE INVENTION

The present invention seeks to provide an upwardly pivotable extrusion head, generally of the above-described type, which can be used for the simultaneous extrusion of a plurality of rubber or thermoplastics material mixtures to form a flat profile. More particularly, the present invention seeks to provide an extrusion head in which, for example, it is possible to change one of the mixtures, such as the tread strip mixture, in a simple manner without adversely affecting the extrusion of the other mixtures, such as those forming the lateral strips and the base layers of a tyre. The present invention also seeks to provide an extrusion head which minimizes the considerable material losses of the unchanged mixtures when the extrusion devices are restarted and which prevents air from entering into all of the flow channels by opening the head during the upwardly pivoting process. The present invention therefore seeks to provide an extrusion head in which, if one mixture needs to be changed, only the relevant flow channel containing that mixture needs to be emptied and cleaned.

It is most important, in such a case, to enable the change of mixture to be effected extremely rapidly. The present invention therefore seeks to provide an extrusion head which permits the extrusion of the unchanged mixtures to be recommenced as quickly as possible without any adverse affect.

SUMMARY OF THE INVENTION

According to the present invention, there is provided an extrusion head for extruding the tread strip portion of a vehicle tyre in the form of a flat profile, the profile being formed from rubber or plastics materials, the materials being extruded from a plurality of extrusion presses disposed one above the other, a first of the presses extruding a tread strip mixture, a second of the presses extruding a lateral strip mixture and a third of the presses extruding a base or lower mixture, the extrusion head comprising a fixed central portion and pivotable upper and lower portions disposed on opposed sides of the central portion, insert members disposed between the central portion of the head and each of the upper and lower head portions, the insert members and the planar surfaces of the head portions adjacent thereto jointly defining flow channels communicating with each of the extrusion presses, the head further comprising an interchangeable front template member having flow channels formed therein communicating with the flow channels formed in the insert members and an interchangeable end template member for defining the external configuration of the flat profile, wherein the flow channel for the lateral strip mixture is bifurcated and wherein the bifurcated channel for the lateral strip mixture enters the front template member below the flow channel for the tread strip and leads to both sides of the upper surface of the tread strip flow channel, the flow channel for the lateral strip mixture discharging towards the lateral longitudinally extending walls of the tread strip mixture.

By causing the lateral strip mixture to enter the front template beneath the tread strip flow channel but then to provide flow channels therefor which lead at both sides of the tread strip flow channel and open out or discharge towards the lateral, longitudinally extending walls of the extruded tread strip mixture, the flow channel for the tread strip mixture, which is frequently changed, can pass through the major portion of the head as the uppermost flow channel. This is despite the fact that the tread strip mixture must be supplied to the front template as the central one of the three mixtures in order to ensure optimum flow in this flow channel.

When the tread strip mixture is to be changed, the front and end templates are initially removed. Locking means for locking the upper portion of the extrusion head in position are released, and the upper portion of the head is raised. The tread strip flow channel is now accessible and can be cleaned without the need for releasing locking means provided for locking the lower head portion in position and for pivoting the lower portion downwardly, as was necessary in the prior art arrangement. In consequence, the flow channels in the insert members for the lateral strip mixture and for the lower rubber mixture are not adversely affected.

No air can penetrate into these two flow channels because there is no need to release the means for locking the lower portion of the head. It is only necessary to clean the very short flow channel sections in the front and end templates for the lateral strips mixture and the base or lower rubber mixture. As a rule, the front template needs to be changed when other tread strip mixtures are being processed.

It is relatively rare for the rubber mixture for the lateral strips or for the lower or basic rubber mixture to be changed.

If, in addition to changing the tread strip mixture, the tread strip size is also to be changed, suitably modified front and end templates are used, but the modified front template must still have flow channels for the lateral strip mixture of the type set forth hereinbefore.

BRIEF DESCRIPTION OF THE DRAWINGS

Reference will now be made to the accompanying drawings in which FIGS. 1 to 4 inclusive show various views of a known extrusion head and FIGS. 5 to 8 inclusive show various views of one embodiment of an extrusion head in accordance with the present invention. In the drawings.

DETAILED DESCRIPTION OF THE DRAWINGS

Figure 1:
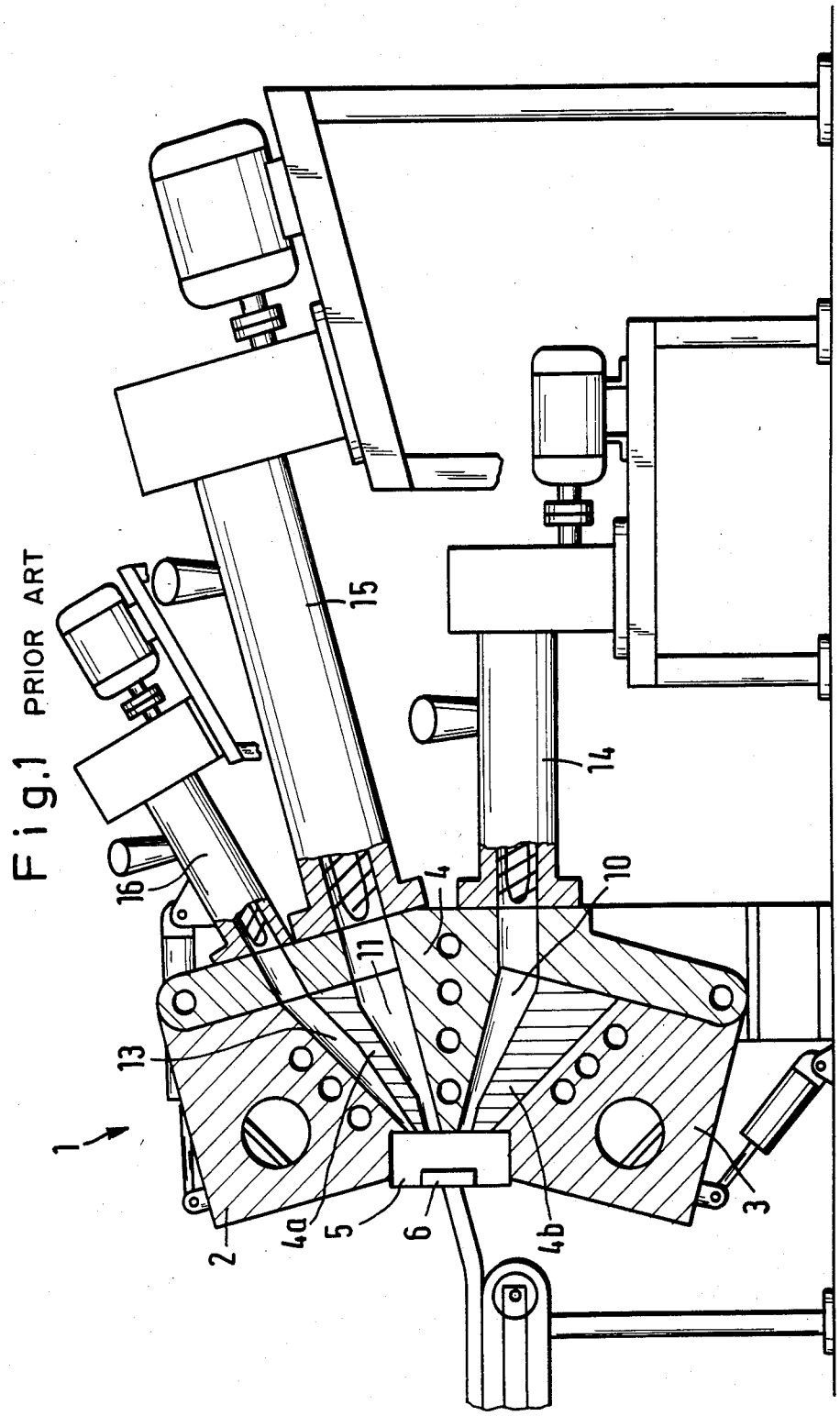
FIG. 1 is a longitudinal sectional view through a prior art extrusion head.

FIGS. 1 to 4 show a known extrusion head, basically of the type disclosed in British Patent Specification No. 2 131 734A. Such an extrusion head is for producing a tread strip from three different rubber mixtures.

The extrusion head, generally referenced 1, comprises a fixed central portion 4 and upper and lower portions 2 and 3 respectively. Both portions 2 and 3 are pivotable away from the central portion 2 into an inoperative position. They are, however, shown in their operative positions in FIG. 1.

Between the lower surface of the upper head portion 2 and the central portion 4 and also between the upper surface of the lower head portion 3 and the central portion 4, insert members 4a and 4b respectively are located. Flow channels 10, 11 and 13 are defined by grooves formed in the appropriate surfaces of the insert members 4a and 4b which flow channels are bounded by the planar surface of the head portion adjacent thereto. The insert members 4a and 4b are described in detail in British Patent Specification No. 2131734.

Figure 4:
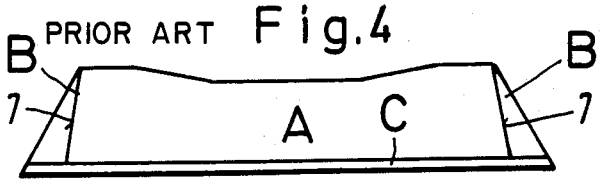
FIG. 4 is a cross-sectional view, through an extruded profile, taken along the line IV—IV of FIG. 2.

In manufacturing a vehicle tyre from different mixtures A, B and C, an extrusion device 16 extrudes mixture B, which forms the lateral tread strip portion, into flow channel 13, an extrusion device 15 feeds the tread strip mixture A into flow channel 11, and an extrusion device 14 feeds the base rubber mixture C into flow channel 10. The flat profile emerging from such an extrusion head has a cross-section as shown in FIG. 4. A front template 5 and an end template 6 are disposed at the outlet or discharge end of the extrusion head 1.

Figure 2:
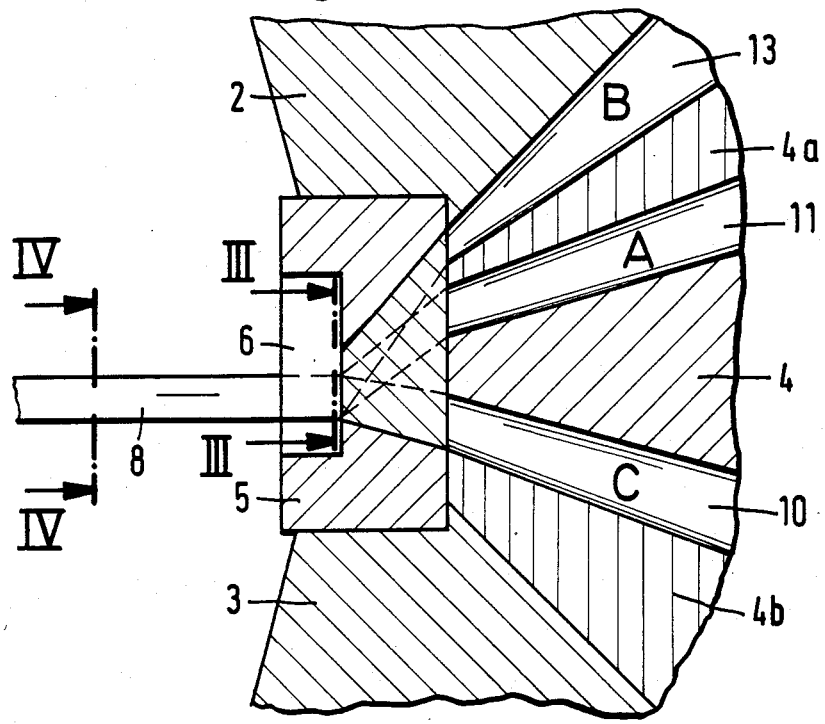
FIG. 2 is a longitudinal sectional view, similar to FIG. 1 but on an enlarged scale relative thereto, of the profile discharge region of the prior art extrusion head.

FIG. 2 shows, in greater detail, the profile discharge region of the prior art arrangement shown in FIG. 1. As can best be seen in FIG. 2, the insert member 4a is disposed between the upper portion 2 and the central portion 4 of the head and has the flow channels 11 and 13 formed therein for the tread strip mixture and the lateral wall mixtures A and B respectively whilst the insert member 4b is disposed between the fixed central portion 4 of the head and the lower pivotable portion 3 thereof. The member 4b has the flow channel 10 formed therein for the lower or base rubber mixture C.

Figure 3:
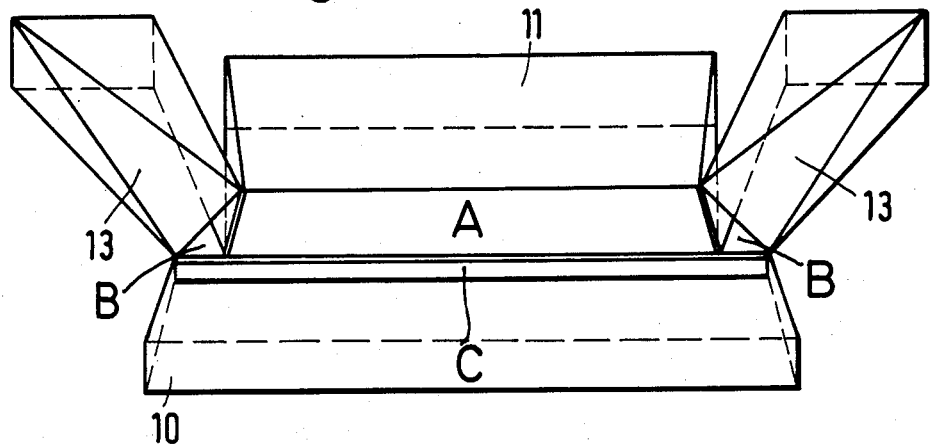
FIG. 3 is a front elevational view looking along the line III—III of FIG. 2 and shows the directional paths of the flow channels.

FIG. 3 is a front elevational view of the front template 5 shown in FIG. 2. The flow channels 10, 11 and 13 have been included in this view so as to show the directional paths thereof more clearly.

It must be emphasized that, in this prior art arrangement, the flow channels 13 for the material forming the lateral strips of the vehicle tyre come from above and, as can also be seen in FIG. 2, extend towards the channel 11 for the material forming the tread strip and the channel 10 for the material forming the lower or base portion of the tread strip.

With the extrusion head shown in FIGS. 2 and 3, good directional paths for the channels are achieved because the lateral strip mixture is extruded, from above, towards the longitudinal walls 7 of the tread strip mixture.

According to the prior art arrangement, therefore, the extrusion device for the lateral strip mixture B is disposed on the extrusion device for the tread strip mixture A in order to permit the mixture to pass without deflection into the front template 5, through short flow channels, the flow channels 13 which branch off towards both sides being disposed in the insert members. From a rheological point of view, such an arrangement of the flow channels is considered good.

However, almost insurmountable disadvantages arise if, in an extrusion head having flow channels of the type described hereinbefore, the tread strip mixture A needs to be changed. As previously stated, such a change may be necessary up to ten times in each working shift.

To permit the tread strip mixture A in channel 11 to be changed, it is necessary to release locking means provided for locking the upper head portion 2 in its operative position and to pivot the head portion 2 upwardly. It is therefore inevitable that air will enter the flow channels 11 and 13. Such air penetration necessitates that the insert member 4a, which accommodates the channels 11 and 13, must be removed and cleaned. If air also passes into the extrusion devices 15 and 16 during this process, a long starting-up process becomes necessary. This produces a considerable amount of waste material.

Since only the tread strip mixture needs to be changed frequently, an extrusion head of this type can only be operated in a relatively uneconomic manner. This is because there are inevitably long periods when the apparatus is standing idle.

Figure 5:
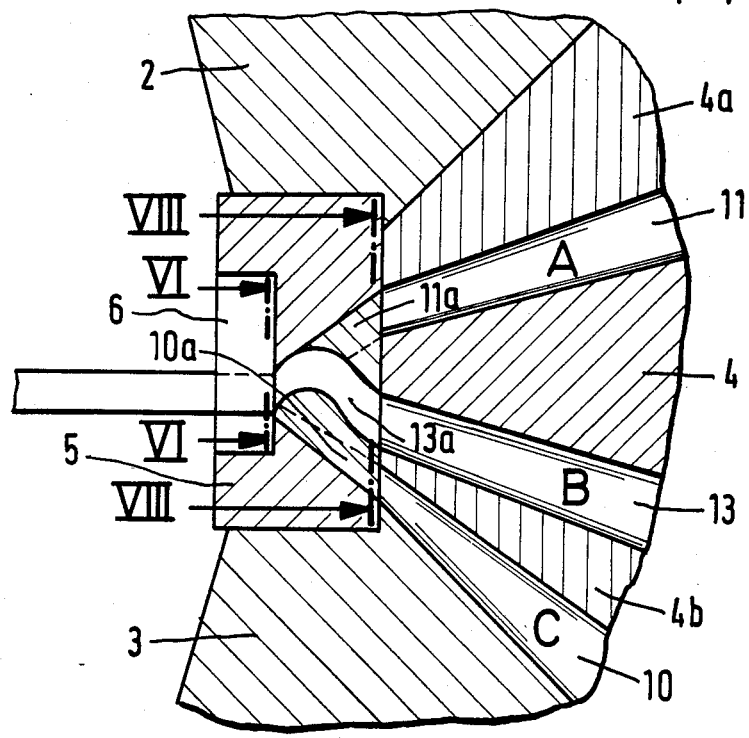
FIG. 5 is a longitudinal sectional view, similar to FIG. 2, but showing the profile discharge region of an extrusion head according to the present invention.
Figure 6:
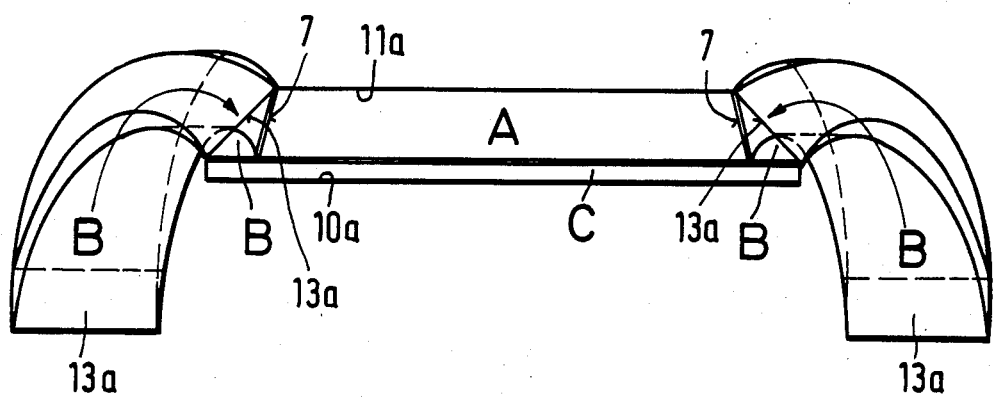
FIG. 6 is a front elevational view similar to FIG. 3 but taken along the line VI—VI of FIG. 5, and similarly showing the directional paths of the flow channels.

FIGS. 5 and 6 illustrate an apparatus in accordance with the present invention in which the above-described problems are, it is believed, overcome. In FIGS. 5 to 8, like reference numerals are used to denote like parts described with reference to FIGS. 1 to 4.

On the one hand, in the arrangement of the present invention air passes into the tread strip flow channel 11 when the tread strip material is being changed. Entry of air into this particular flow channel is unimportant because such channel has to be cleaned whenever the mixture is changed. On the other hand, the construction of the apparatus of the present invention has to take into account the rheological flow behaviour of a rubber mixture, such as the most appropriate locations for deflecting the direction of flow of the material in the flow channels. In particular, an apparatus had to be devised in which the tread strip mixture could be changed and the flow channels cleaned very quickly.

Accordingly, as shown in FIGS. 5 and 6, the flow channels 13a formed in the front template for the mixture forming the lateral strips of the tyre are so arranged that, when viewed in the working direction, they come from beneath the flow channel 11 carrying the tread strip material. In the longitudinal direction, the channels 13a extend along both sides of the tread strip flow channel 11 and open out towards the lateral longitudinal walls 7 of the extruded tread strip mixture such that the extruded profile is identical to that shown in FIG. 4.

This arrangement of the flow channels 13a in the front template 5 permits the flow channel 13 for the lateral strip mixture B to be transposed into the lower portion of the head, that is to say, to be defined by the insert member 4b located between the fixed central head portion 4 and the pivotable lower head portion 3 with the flow channel 10 for the base rubber mixture C.

Thus, only the flow channel 11 for the tread strip mixture A is located in the upper portion of the head, that is to say, defined by the insert member 4a disposed between the fixed central head portion 4 and the pivotable upper head portion 2.

Figure 7:
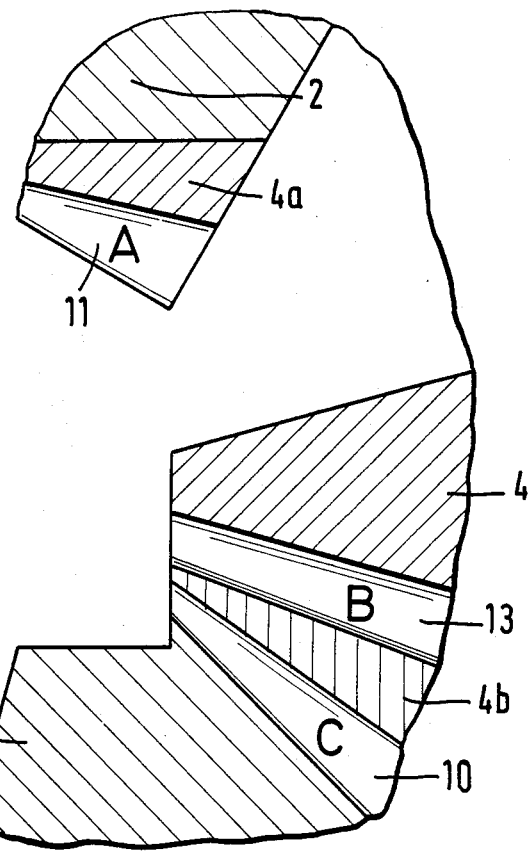
FIG. 7 is a longitudinal sectional view similar to that shown in FIG. 5, but with front and end templates shown in FIG. 5 removed and with one portion of the extrusion head being shown in an upwardly pivoted position.

When it is required to change the tread strip mixture B, the locking means for locking the upper portion 2 of the head is released, and the upper head portion 2 is upwardly pivoted as shown in FIG. 7.

By so doing, the flow channel 11a, for the tread strip mixture A is immediately accessible and may be cleaned without the possibility of air penetrating into either of the flow channels 10a or 13a.

Since the deflection of the two flow channels 13a for the lateral strips in the front template occupies only a short distance, no notable rheological disadvantages arise. In fact, such an arrangement has the additional advantages of causing the lateral strip mixture B to abut more satisfactorily against the longitudinal walls 7 of the tread strip A and producing an even better adhesive connection of the lateral strip mixture B with the tread strip mixture A.

In FIG. 7, the discharge region of the head shown in its upwardly pivoted position, that is to say, with the upper portion 2 of the head 1 having been raised by means of, for example, a hydraulic cylinder of the type shown in FIG. 1. It can be seen, from FIG. 7, that the tread strip mixture channel 11 in the removable insert member 4a can now be easily cleaned.

Figure 8:
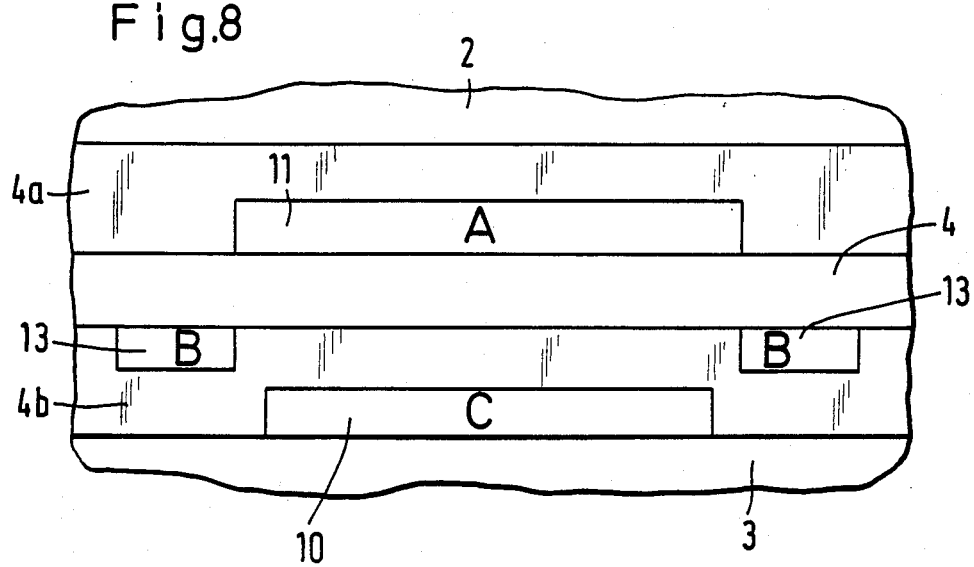
FIG. 8 is a front elevational view, as seen along the line VIII—VIII of FIG. 5.

FIG. 8, which is a view taken along the line VIII—VIII of FIG. 5 shows the outlet of the flow channels 10, 11 and 13 from the insert members 4a and 4b. The flow channels 10a, 11a and 13a then extend from such outlet through the front template 5 shown in FIG. 5 in which the two lateral flow channels 13a come from below as shown in FIG. 6 and discharge with the flow channel 11a for the tread strip mixture A and against the side walls 7 of the flow channel 11a.

This Figure clearly shows that there is only a very short, and hence almost non-detrimental, deflection of the channels 13a in the front template 5.

I claim:

1. An extrusion head for extruding a flat profile for forming the tread strip portion of a vehicle tyre from different mixtures of materials selected from rubber and plastics materials, said tread strip portion comprising a tread strip, lateral strip portions disposed laterally of said tread strip and a base layer supporting said tread strip, said head comprising a fixed central portion, said central portion including opposed planar faces, first and second outer portions disposed proximate said opposed faces of said central portion on opposed sides of said central portion, both said first and said second outer portions including opposed planar faces and both said outer portions including pivot mounting means to permit said outer portions to be pivoted away from said central portion, insert members disposed between each of said outer portions and said fixed central portions, each said insert member including opposed major surfaces abutting said planar surface of said head portion adjacent thereto, at least one of said major surfaces of each said insert member defining at least one groove such that said groove defines a flow channel bounded by said abutting planar surface of said head portion adjacent thereto, wherein at least first, second and third said flow channels are defined, first, second and third feed means for supplying different mixtures of material respectively to said first, second and third flow channels wherein said respective feed means are disposed one above the other, said first feed means supplying said mixture for said tread strip, said second feed means supplying said mixture for said lateral strips and said third feed means supplying said mixture for said base layer, said head further comprising an interchangeable front template receiving material discharged from said flow channels in said insert members, said front template defining at least first, second and third flow channels communicating, respectively with said first, second and third flow channels formed in said insert members, and an interchangeable end template member mounted at the discharge end of said front template member, said end template member defining the external configuration of said extruded flat profile, wherein said second flow channel for said lateral strip mixture is bifurcated in at least said front template member and wherein said channel for said lateral strip mixture enters said front template member from said second flow channel in said insert member below said flow channel for said tread strip and is directed towards opposite sides of the upper surface of said tread strip flow channel, said flow channel in said front template member for said lateral strip mixture discharging said mixture along the lateral, longitudinally extending, walls of said tread strip mixture.

* * * * *